May 22, 1956
T. W. KELLER ET AL
ELECTRICALLY CONTROLLED WEB FEEDING
MEANS FOR A BAG MAKING MACHINE
2,746,752
Filed April 9, 1952
8 Sheets-Sheet 1
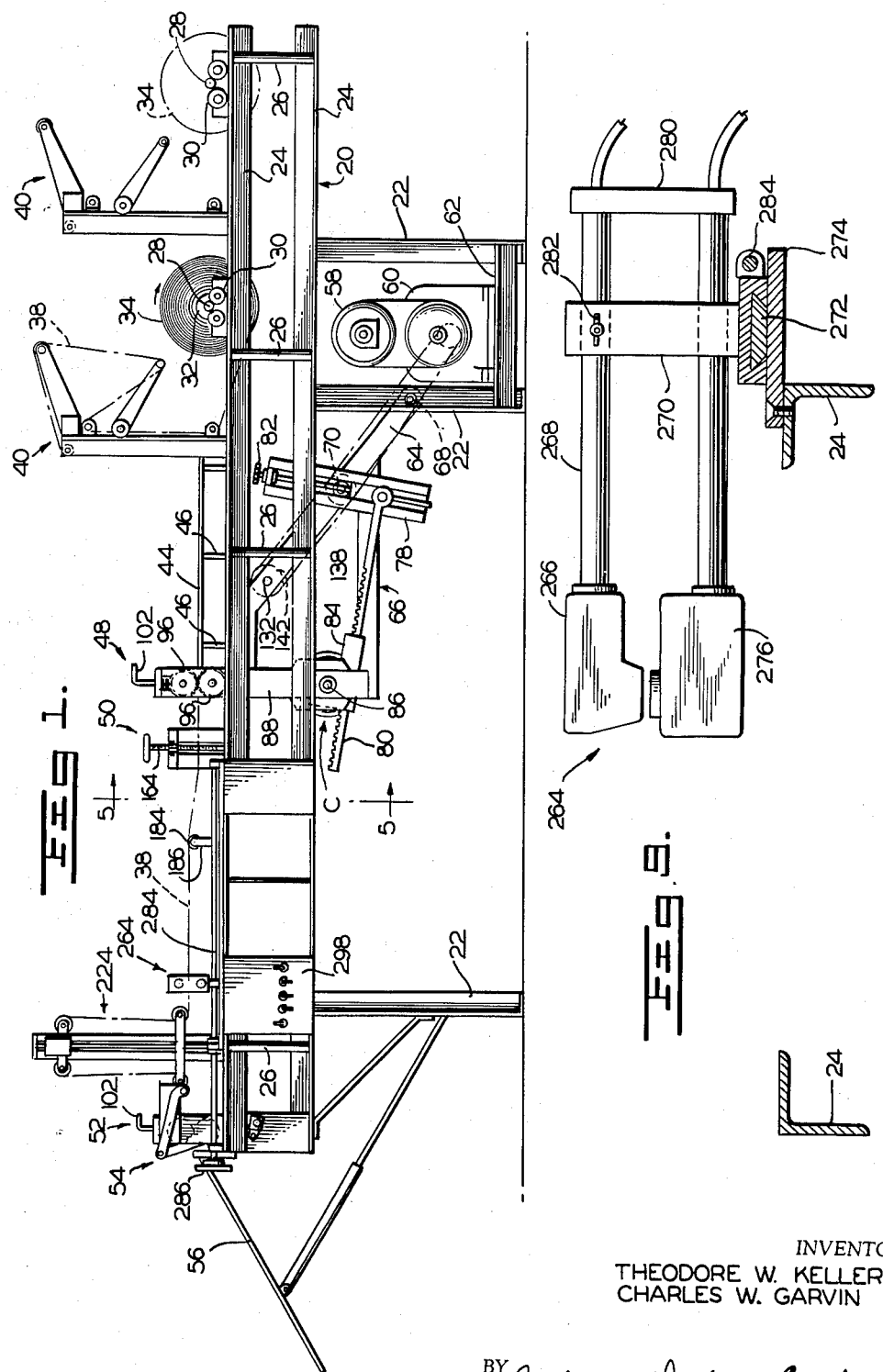
INVENTOR
THEODORE W. KELLER
CHARLES W. GARVIN
BY Cushman, Darby & Cushman
ATTORNEY

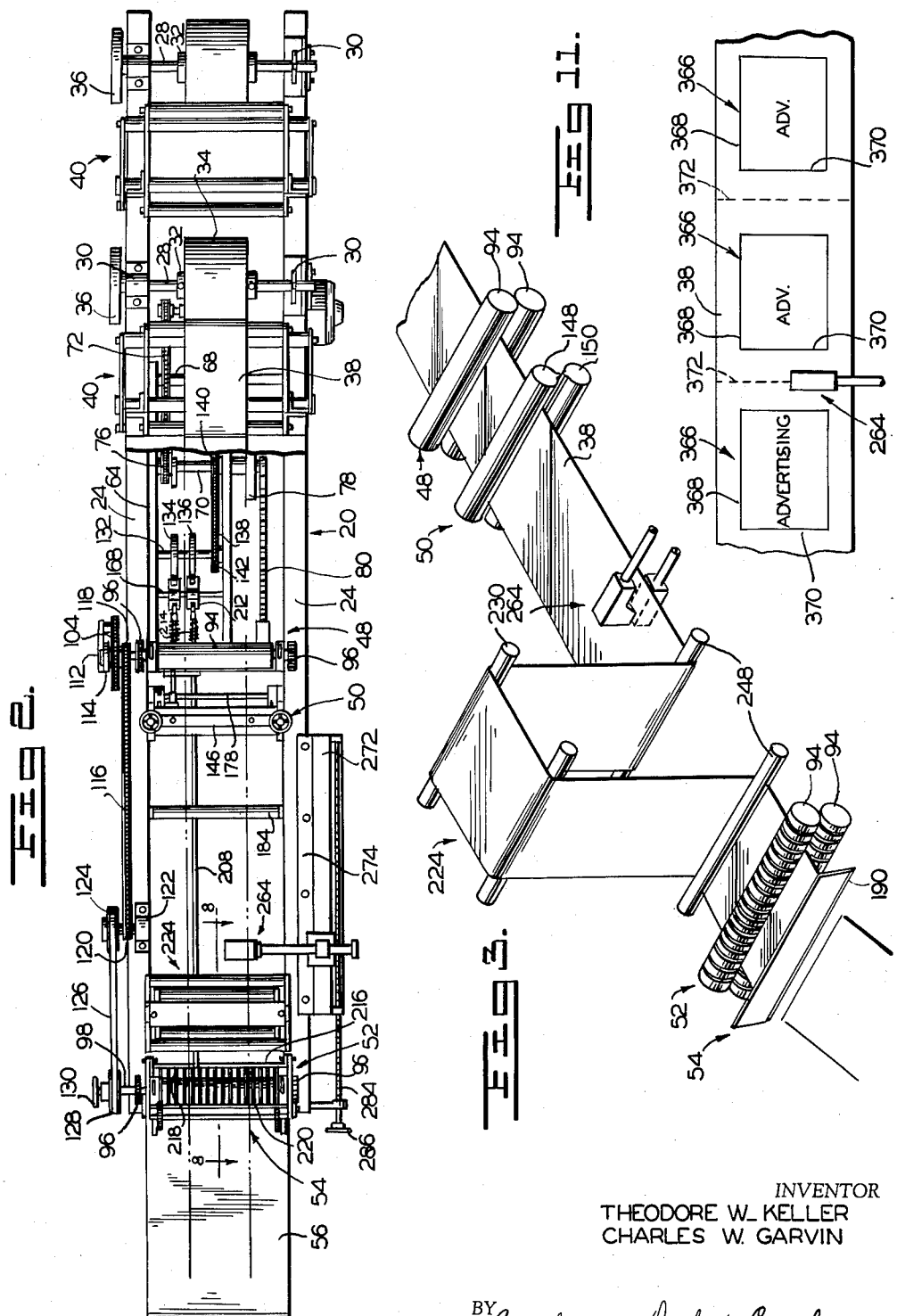

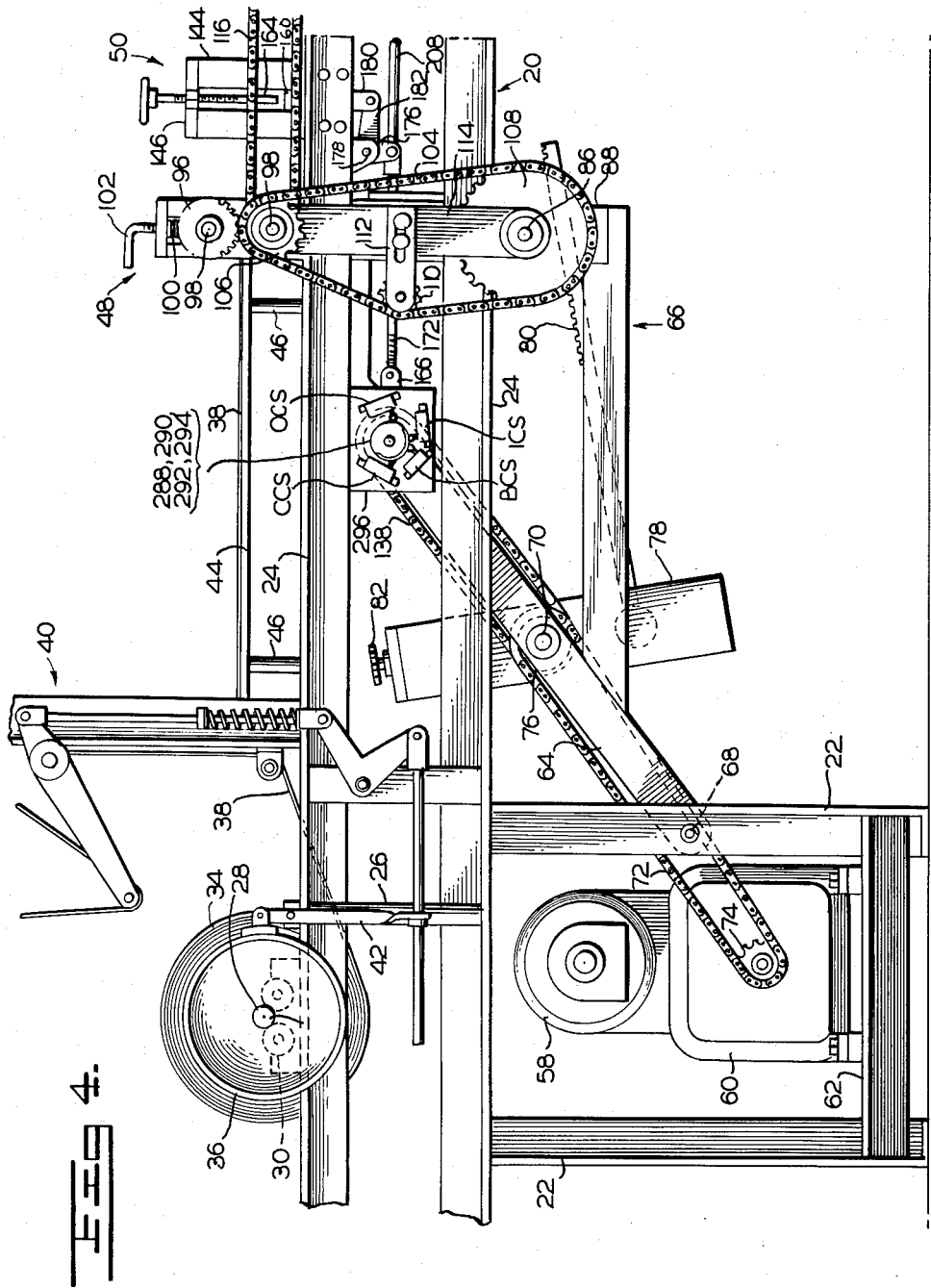

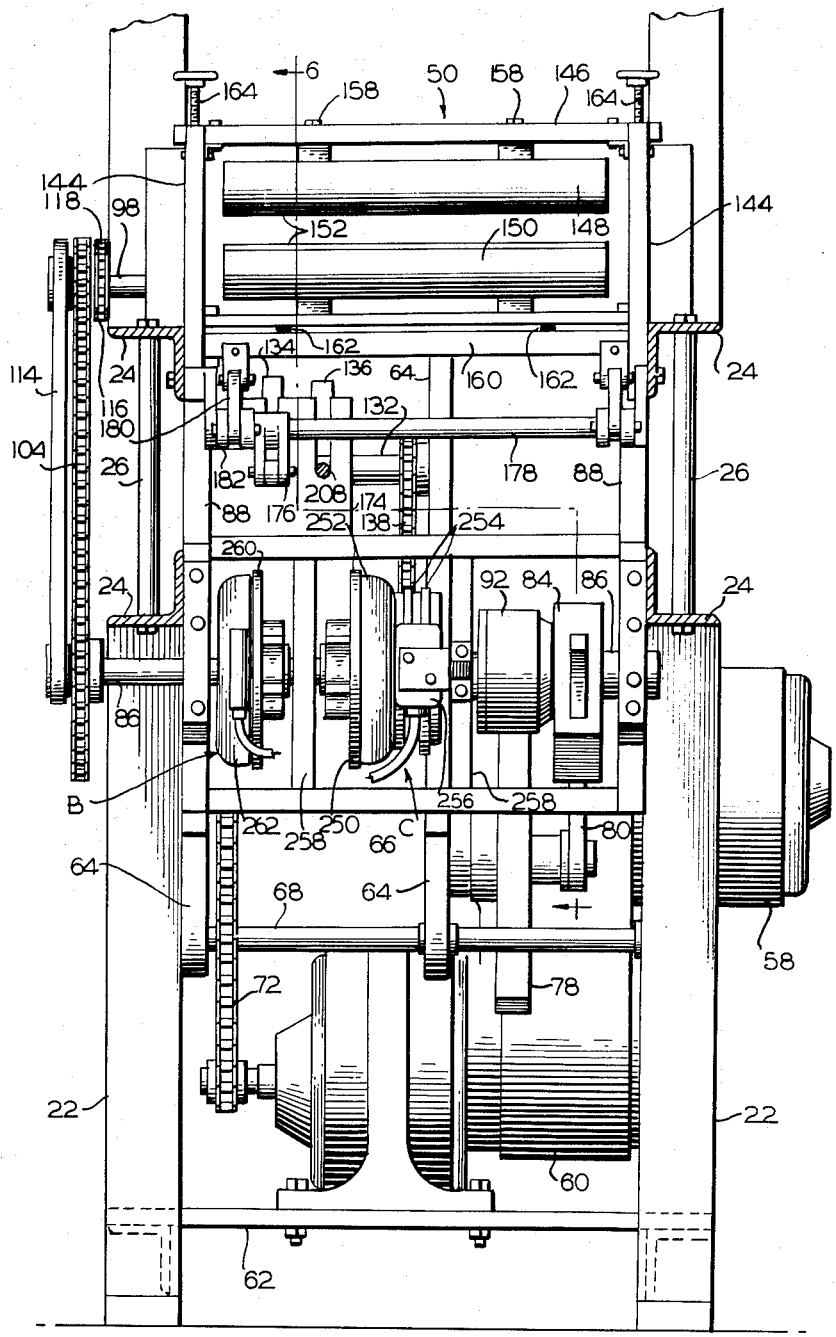

MANUAL SWITCH OPERATION

| | RS | AS | PS | CS | BS |
|---|---|---|---|---|---|
| PRINTED BAG OPERATION | CLOSED | CLOSED | CLOSED | OPEN | CLOSED |
| PLAIN BAG OPERATION | CLOSED | OPEN | OPEN | CLOSED | CLOSED |

INVENTOR
THEODORE W. KELLER
CHARLES W. GARVIN

BY Cushman, Darby & Cushman
ATTORNEY

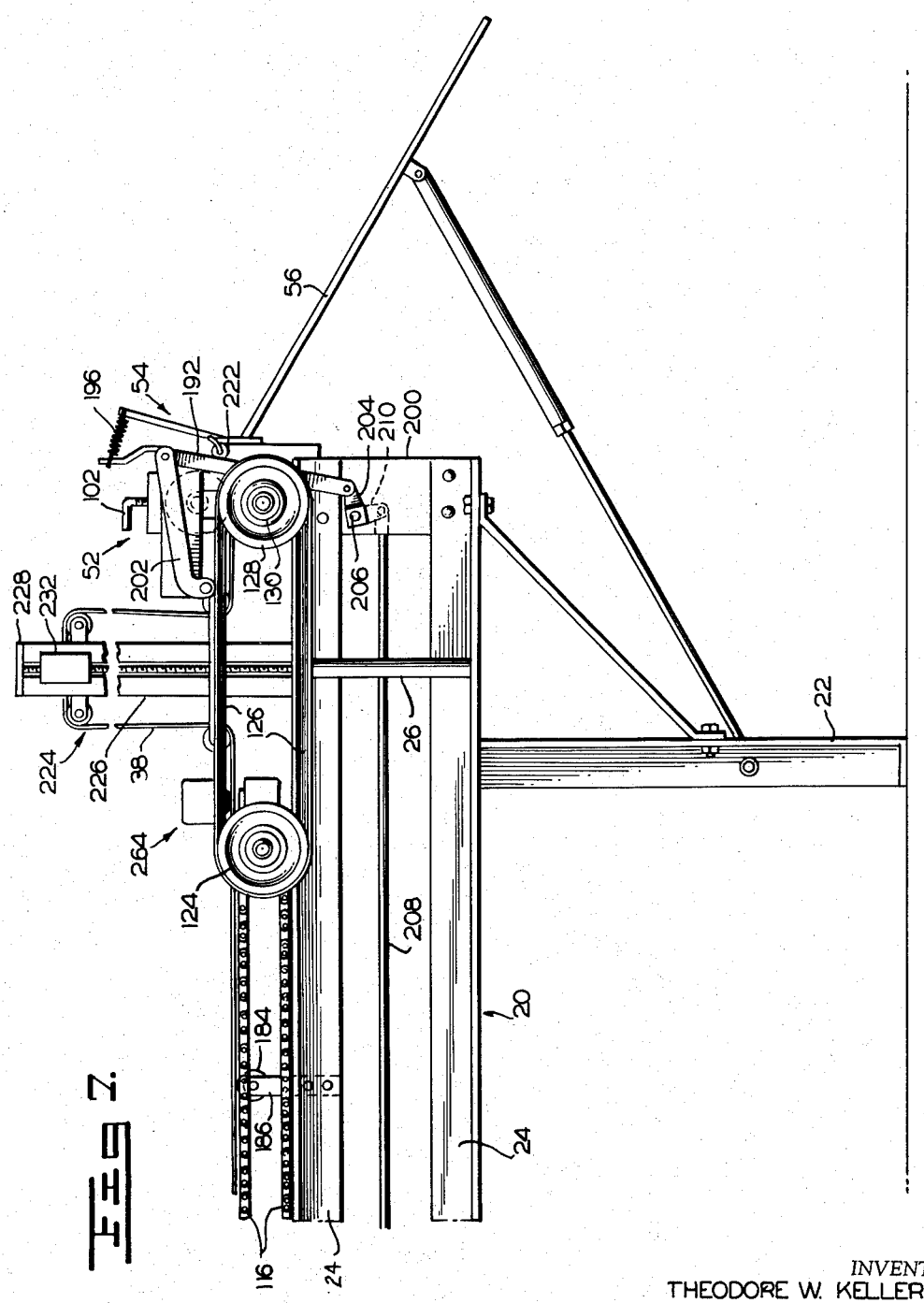

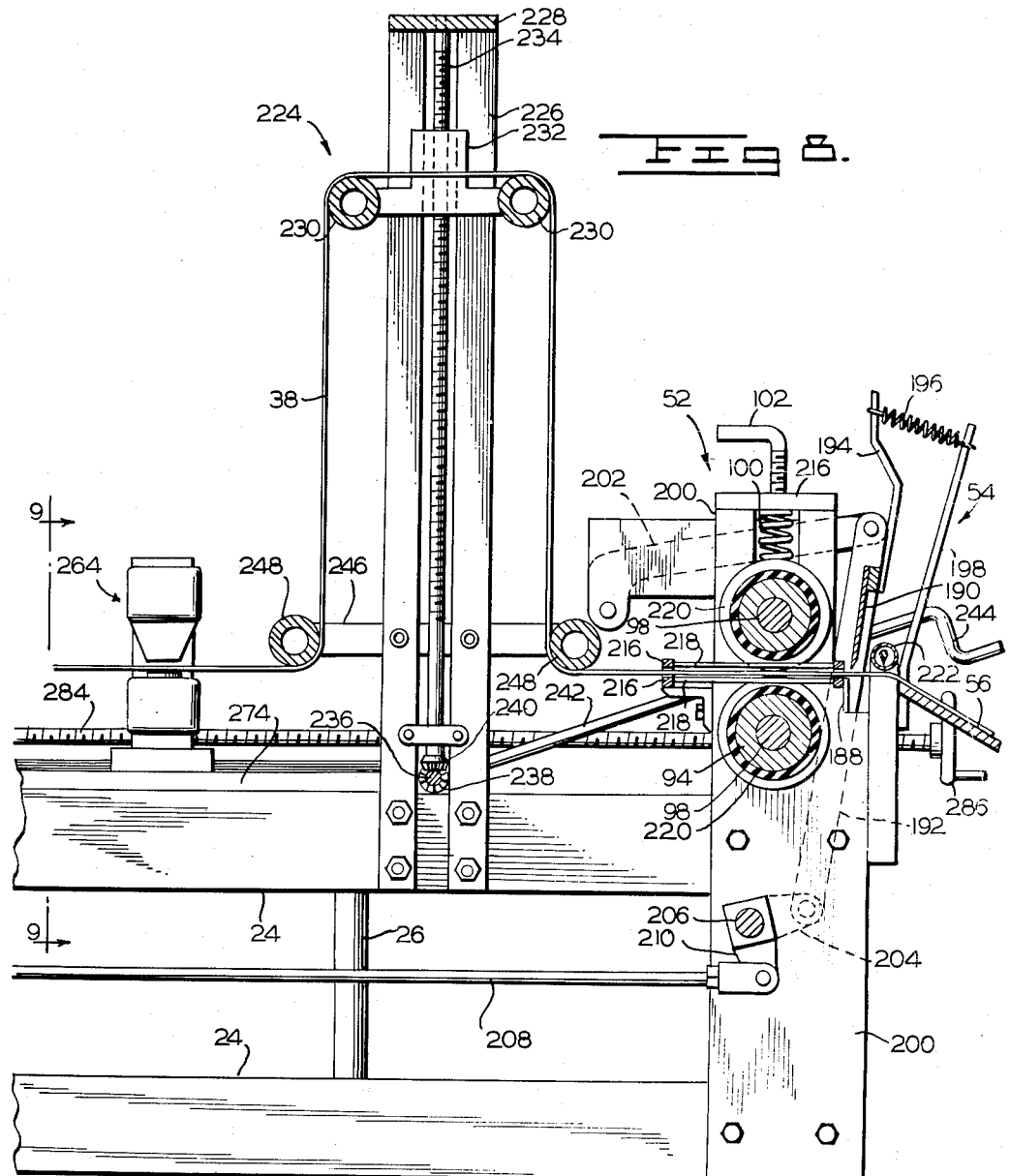

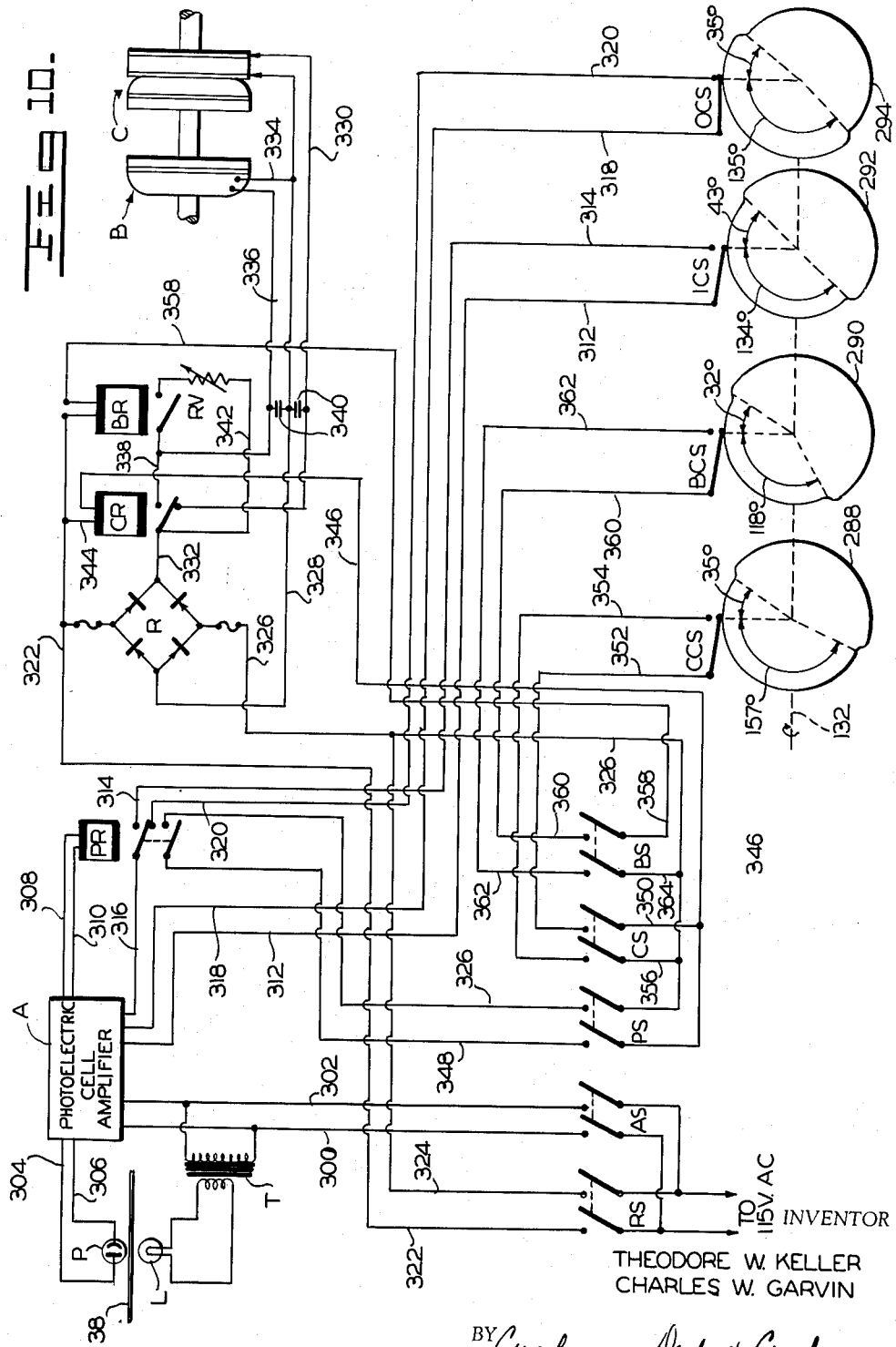

United States Patent Office 2,746,752
Patented May 22, 1956

2,746,752

ELECTRICALLY CONTROLLED WEB FEEDING MEANS FOR A BAG MAKING MACHINE

Theodore W. Keller, Council Bluffs, Iowa, and Charles W. Garvin, Omaha, Nebr.; said Garvin assignor to said Keller Application April 9, 1952, Serial No. 281,338

13 Claims. (Cl. 271—2.6)

This invention relates to a method and machine for heat sealing multi-layer thermoplastic sheet material, and more particularly to a continuous method and machine for fabricating bags from tubular extruded thermoplastic stock.

In the copending application of Keller et al., Serial No. 82,934, now abandoned, there is disclosed apparatus and method for intermittently advancing flattened tubular thermoplastic sheet material from a suitable supply in measured and regulated bag lengths, which material is transversely heat sealed at one station, while at rest, and transversely severed at a subsequent station, while at rest, to form a finished bag. The sheet material or web is advanced by two pairs of feed rolls intermittently operated in unison. One pair of feed rolls is positioned in advance of the heat sealing station, while the other pair of feed rolls is positioned immediately before the severing station. Because of the characteristics of the thermoplastic sheet material or stock frequently used, such as polyethylene and polyvinylidene chloride, such materials are difficult to handle and fabricate satisfactorily by conventional heat sealing methods and machines. Among these characteristics may be mentioned that of a tendency to deform when heated and to stretch readily. The stretchable characteristics of the stock vary somewhat with the thickness of the sheet, the nature of the material, and also with each batch of the raw material from which such stock is extruded.

Because of the ready and variable stretch characteristics of thermoplastic stock of this nature, it is extremely difficult to obtain proper registry of a repeat pattern printed on the stock on each bag formed by the foregoing described method and apparatus. In particular, when the stock is run through a printing machine to print a repeat pattern, such as advertising material, thereon, it has been found that the spacing between such patterns progressively increases toward the end of the run. Because of this and other conditions which effect variations in individual spacings of a repeat pattern printed on the stock, it has been found to be extremely difficult to obtain and maintain proper registry of the pattern on each bag by means of the apparatus and machine disclosed in the aforementioned application.

The feed rolls of the machine disclosed in the aforementioned application are intermittently operated in unison by means of a reciprocating rack operating a drive for the rolls that has a one-way engaging clutch therein. Accordingly, upon one stroke of the rack the feed rolls are rotated to advance the stock a predetermined distance, which is adjustable by varying the stroke of the rack, while the reverse or return stroke of the rack is inoperative to move the feed rolls because of the aforementioned one-way engaging clutch. The rolls, however, and their associated drives from the one-way engaging clutch, have considerable mass or inertia. Therefore, the feed rolls tend to continue their web-advancing rotation, or to coast somewhat, upon reversal of rack movement at the end of its "advancing" stroke. The amount of "coast" of the rolls is not constant from stroke to stroke of the rack and also varies somewhat with the type and nature of the stock being operated upon. The ultimate result is to produce variations in bag length.

Therefore, it is an object of this invention to provide an improved method and apparatus for fabricating bags from thermoplastic tubular stock that produce bags of uniform length.

It is another object of this invention to provide an improved method and machine for fabricating bags from tubular stock having a repeat pattern printed thereon in which the pattern is in proper registry on each fabricated bag.

It is still another object of this invention to provide a machine of the type described which optionally may operate upon unprinted tubular stock and produce plain bags of uniform length or operate upon printed tubular stock and secure proper registry of the pattern on each bag.

It is still another object of this invention to provide improved and novel means for controlling the intermittent advance of a web having a repeat pattern printed thereon in accordance with the spacing between the separate patterns.

It is still another object of this invention to provide an improved and novel apparatus for intermittently advancing a web of stretchable material in uniform steps.

Other objects and advantages of the invention will become apparent from the following description and accompanying drawings, in which:

Figure 1 is a side elevational view of a machine embodying this invention.

Figure 2 is a plan view of the machine shown in Figure 1.

Figure 3 is a schematic view illustrating the progress of the stock through the machine shown in Figure 1 and showing the various operations performed on such stock.

Figure 4 is an enlarged fragmentary side elevational view of the drive portion of the machine shown in Figure 1 and taken from the opposite side of the latter figure.

Figure 5 is an enlarged transverse vertical sectional view taken substantially upon the line 5—5 of Figure 1.

Figure 7 is an enlarged fragmentary side elevational view of the terminal end of the machine shown in Figure 1, and taken from the opposite side of the latter figure.

Figure 8 is an enlarged fragmentary longitudinal vertical sectional view taken substantially upon line 8—8 of Figure 2.

Figure 9 is an enlarged vertical sectional view taken substantially on the line 9—9 of Figure 8.

Figure 10 is a schematic wiring diagram of the electric controls of the machine.

Figure 11 is a diagrammatic view illustrating the cooperation of the photoelectric cell with a repeat pattern printed on a web.

Figures 6, 12:
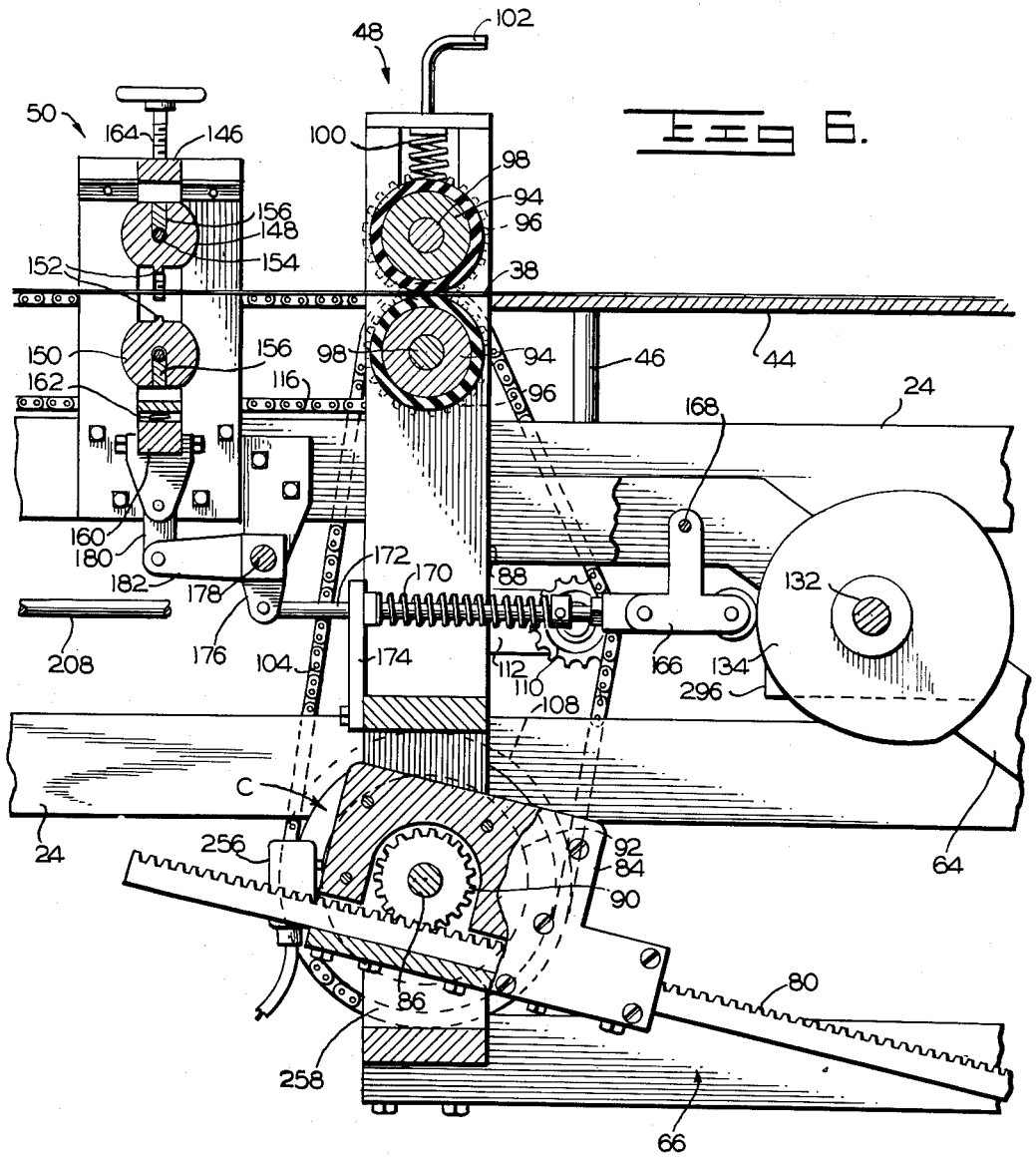
Figure 6 is an enlarged longitudinal fragmentary vertical sectional view taken substantially upon the line 6—6 of Figure 5.
Figure 12 is a chart illustrating the position of manual control switches for printed bag or plain bag operation.

Referring to the drawings, particularly Figures 1, 2, and 4, the machine comprises a frame 20 suitably mounted on a plurality of legs 22, six as shown in the drawings. The side members of the frame 20 consist of vertically spaced angle bars 24 suitably secured together at longitudinal intervals by vertical supporting struts 26. At one end of the frame 20 a plurality of spindles 28 are removably mounted in suitable bearings 30, each of the spindles carrying a pair of adjustable positioning cones 32 adapted to position and align the hollow cores upon which rolls 34 of flattened tubular stock are customarily wound. One end of each spindle 28 has a brake drum 36 mounted thereon for rotation therewith.

Rolls of stock 34 consisting of a flattened tubular thermoplastic web 38 may be mounted on each of the spindles 28 and fed into the machine one at a time, each roll 34 as it approaches exhaustion being sealed or suitably connected to a new roll on another spindle, thus permitting the machine to operate substantially without interruption for stock replenishment and avoiding the necessity of re-threading the machine with each roll of stock. Operated in this fashion, the machine processes a single stock strip, and produces bags singly. To produce a plurality of bags simultaneously, as may be desirable in operating with narrow stock, a stock roll 34 may be mounted on each spindle 28 in laterally offset relation to each other, and the separate webs 38 passed through the machine side by side. The several feeding or advancing, sealing, and cutting mechanisms function in the same manner whether operating upon a single strip or upon a plurality of strips.

The spindles 28 revolve in the direction shown by the arrows in Figure 1, and a web 38 is drawn from each roll 34 along the path indicated by the dotted line, passing through a corresponding let-off mechanism, indicated generally at 40. These mechanisms 40 are connected to brake levers 42 (Figure 4) operating on the brake drums 36 of the respective spindles 28, so that the advance of stock 38 through a let-off mechanism brakes its corresponding spindle to maintain proper tension on the web. The brake and let-off mechanisms are described more fully in the aforementioned application, so no further description is necessary here.

From the let-off mechanism 40, the web 38 passes over a table section 44 mounted in spaced relation on and above the frame 20 by supporting posts 46, and then successively through a first feed roll stand, indicated generally at 48, a heat sealer 50, a second feed roll stand 52, a cutter 54, and onto a receiving chute 56. The travel of the web 38 through these instrumentalities is shown more clearly in the schematic illustration of Figure 3. The feed rolls, the heat sealer, and the cutter, which are each described in detail hereinafter, are all intermittently driven in a properly coordinated manner by a single source of motive power, such as an electric motor 58 having as an integral unit therewith a variable speed transmission 60. The motor and transmission are mounted beneath the machine frame 20 on a platform 62 that is supported on four of the legs 22 somewhat above the lower ends or feet of the latter.

Journalled in the side members 64 of a lower supporting or under frame 66, secured to both the main frame 20 and a cross bar 68 extending between two of the legs 22, is a main drive shaft 70 driven by the motor 58 by means of a chain 72 engaging appropriate sprockets 74 and 76 on the motor shaft and on the main drive shaft, respectively. Mounted on the end of the main drive shaft 70 is an adjustable crank 78 having one end of a rack 80 pivotally connected thereto for reciprocation thereby. The throw of the crank 78, and hence the travel of the rack 80, may be adjusted by a hand wheel 82 on the crank which operates adjusting mechanism that is described in greater detail in the aforementioned copending application. Hence, no detailed description thereof is deemed necessary here. The rack 80 reciprocates within a gear case 84 (Figures 5 and 6) that is pivotally mounted on a feed roll drive shaft 86 suitably journalled in the side members 88 of the under frame 66 (Figures 5 and 6). These side members 88 are formed by depending extensions of the side members of the roll stand 48. A gear 90 rotatably mounted on the shaft 86 within the case 84 is keyed to a conventional one-way engaging clutch indicated generally at 92. This clutch 92 transmits rotary motion of the gear 90 in one direction only, to the feed roll drive shaft 86. It will be readily understood that by means of the crank 78, rack 80, gear 90, and the one-way engaging clutch 92, continuous rotation of the main drive shaft 70 is converted into intermittent rotary movement of the feed roll drive shaft 86. The clutch 92 is so arranged that the feed roll drive shaft 86 is rotated by the pulling movement of the rack 80.

Each of the feed roll stands 48 and 52 supports a pair of contra-rotating feed rolls 94, desirably surfaced with soft rubber or similar traction material. Each pair of rolls 94 has meshing gears 96 (Figure 6) on the ends of the shafts 98 on which the rolls are mounted. These shafts 98 are suitably journalled in the stands and the rolls 94 of each pair are urged into pressure contact by springs 100 bearing on the ends of the upper roll shaft 98. Compression of the springs 100 can be adjusted to vary roll pressure by suitable handled adjusting screws 102. The feed roll pairs are interconnected, and driven in unison in accordance with the intermittent rotation of the feed roll drive shaft 86 by means of a chain 104 running over sprockets 106 and 108 secured respectively to the end of the lower feed roll shaft 98 of the first feed roll stand 48 and the end of the feed roll drive shaft opposite the gear case 84. Preferably, an idler 110 engages the chain 104, for adjusting the tension thereof, and is supported by a bracket 112 adjustably mounted on a plate 114 journally mounted on one end of the feed roll drive shaft 86 and the corresponding end of the lower feed roll shaft 98.

Referring particularly to Figures 2, 4, and 7, the second feed roll stand 52 is driven by means of a chain 116 engaged over a sprocket 118 on the end of the lower feed roll shaft 98 of the first feed roll stand 48 and over a sprocket 120 journalled in a suitable bearing 122 secured to the machine frame 20. Concentric with and fixed to this latter sprocket 120 is a pulley 124 driving a belt 126 engaged over a variable speed pulley 128 mounted on the end of the lower feed roll shaft 98 of the second feed roll stand 52. This latter pulley 128 may be of the type variable in effective pitch diameter by adjustment of a hand wheel 130 thereon.

By the mechanism above described, the feed roll pairs are operated intermittently, in unison, each cycle of operation effecting advance of the web 38 a distance corresponding to a single bag length. The stock advance or bag length may be varied merely by adjusting the hand wheel 82 on the crank 78 to vary the throw of the rack 80. If necessary, the range of bag lengths which the machine is capable of producing may be varied by changing the relative diameters of the sprockets 106 and 108, as will be well understood.

Due to the natural stretch of the thermoplastic web 38 and elongation thereof incident to the heat sealing operation, which is performed between the feed roll stands 48 and 52, in order to maintain the desired tension on the web between the feed roll stands it is essential that the web advance of the second feed roll pair exceed slightly that of the first pair. Since the feed roll pairs operate in unison, or concurrently, to attain this end it is necessary that the peripheral speed of the second feed roll pair exceed that of the first. This peripheral speed differential is effected by the variable speed pulley 128, and may be adjusted thereby as required. Proper tensioning of the stock 38 during and immediately following the heat sealing operation is essential to the successful operation of the machine.

The main drive shaft 70 drives not only the web feeding mechanism, as above described, but also a sealer and cutter drive shaft 132 (Figures 2, 5, and 6), which, by means of cams 134 and 136 mounted thereon, intermittently operates the heat sealer 50 and the cutter 54, respectively, all in proper coordination. The sealer and cutter drive shaft 132 is journalled in the side members 64 of the under frame 66 and driven in a 1 to 1 ratio by a chain 138 engaging sprockets 140 and 142 on the main drive shaft 70 and the sealer and cutter drive shaft, respectively. After passage through the first feed roll pair, the web next passes to the heat sealer 50.

The heat sealer 50 (Figures 5 and 6) comprises guideways 144 extending upwardly from the main frame side members 24, each guideway being composed of two horizontally-spaced vertical members that are joined at their upper end by a transverse I-shaped top member 146. The operative elements of the heat sealer are a fixed upper sealing member 148, and a vertically-reciprocable lower sealing member 150, both having narrow blade portions 152 disposed in opposed relationship. At the bottom of longitudinal slots in each of the sealing members 148 and 150, tubular resistance heating elements 154 extend the length of the members and are secured in the slots by appropriate retainer bars 156. A thermostatic element (not shown) preferably is included within the upper heat sealing member 148. Current to the heating elements 154 is supplied through appropriate electrical conductors (not shown) which include the aforementioned thermostatic element connected in series therewith to maintain the temperature of the sealing members 148 and 150 substantially constant.

The upper sealing member 148 is rigidly mounted on and below the top member 146 by means of bolts 158, desirably secured in heat insulated relationship to the upper sealing member. Below the upper sealing member 148, the guideways 144 retain and guide a vertically reciprocating carriage 160 which carries the lower sealing member 150, preferably resiliently, as by means of the coil springs 162. The approach of the blade portions 152 of the lower and upper sealing members is limited by stop rods 164 threadably engaged in the top member 146 and extending downwardly therefrom within the guideways so that their lower ends serve as adjustable abutments to limit the upward travel of the carriage 160.

The reciprocation of the carriage 160, and the lower sealing member 150, is effected by the engagement of the cam 134 by a cam follower 166 that is pivotally mounted on a transverse rod 168 secured to the side members 64 of the under frame 66 and urged into contact with the cam by a spring 170 enclosing a push rod 172. The push rod 172, which is pivotally connected to the follower 166, extends through a notch in a spring-abutment plate 174 and is pivotally connected to a radial arm 176 mounted on a sealer rock shaft 178 extending between and journalled in bearings secured to the side members 24 of the machine frame 20. By means of a link 180 connecting another radial arm 182 on the rock shaft 178 to the carriage 160, reciprocation of the push rod 172 is adapted to impart vertical reciprocation to the carriage. The cam 134 is shaped and angularly positioned on the sealer and cutter drive shaft 132 so as to effect elevation of the lower sealing member 150 to transversely seal the web 38 between periods of advance of the latter, the sealing engagement of the upper and lower sealing members 148 and 150 being of sufficient duration for accomplishment of a satisfactory heat seal without damage to the stock.

The heat sealer mechanism above described has been found to be particularly effective for the intermittent heat sealing of polyethylene and polyvinylidene chloride stock. Very similar sealing mechanism and the operation thereof are described in somewhat greater detail in the aforementioned copending application.

From the heat sealer 50, the web 38 advances over a transverse supporting roller 184 mounted in an elevated position, with respect to the blade portion 152 of the upper sealing member 148 by journal brackets 186 extending upwardly from side members 24 of the machine frame 20. From thence the web 38 passes through the second feed roll stand 52, and then to the cutter mechanism associated therewith. The cutter 54 (Figure 8) consists of a lower stationary blade 188 and an upper movable blade 190 mounted for vertical reciprocation relative thereto.

The movable cutter blade 190 is pivotally mounted on and between a pair of vertical side links 192. By means of an upwardly extending arm 194 on the blade 190 and a coil tension spring 196 connected to said arm and to a fixed vertical post 198, the cutting edge of the movable blade is constantly urged toward the cutting edge of the lower fixed blade 188. The upper ends of the vertical side links 192 are flexibly connected to side supporting members 200 of the roll stand 52 by links 202, while the lower ends of the vertical side links 192 are pivotally connected to corresponding radial arms, on a cutter rock shaft 206 having the ends thereof suitably journalled in lower extensions 204 of the roll stand side supporting members 200.

From the above construction it will be evident that oscillation of the rock shaft 206 will reciprocate the movable cutter blade 190 to transversely shear and sever the web 38 passing therebeneath into separate bag lengths. Oscillation of the rock shaft 206 in timed relation to the advance of the web 38 by the intermittent rotation of the feed rolls 94 of each pair is effected by a push rod 208 pivotally connected to a radial arm 210 on the cutter rock shaft 206 and having a cam follower 212, similar to the follower 166, engaged with the surface of the cam 136 mounted beside the cam 134 on the cam drive shaft 132. A coil compression spring 214 (similar to the spring 170) mounted between the abutment plate 174 and the follower 212 serves to constantly urge the follower into engagement with the periphery of the cam 136. The periphery (not shown) of the cam 136 is of substantially uniform radius, except for a slight depression which becomes aligned with the follower 212 when the web 38 is at rest so that the follower may drop into such depression and the spring 214 will urge the push rod 208 in a direction to effect the shearing of a bag from the web by the movement of the upper blade 190 of the cutter mechanism.

By means of the cams 134 and 136, it will be seen that the intermittently operated mechanisms of the machine are properly coordinated with the feed roll drive and the step-by-step advance of the web achieved thereby. In other words, the feed roll pairs intermittently advance the web a desired length, namely, the length of one bag, and the heat sealer and cutter function between the periods of web advance when the web is at rest.

Because polyethylene stock when being processed tends to accumulate static electrical charges upon the surface thereof, once the web 38 is severed into individual bag lengths control thereof becomes difficult. To obviate this difficulty the web is guided through the second pair of feed rolls 34 by means of a pair of vertically spaced horizontal guide grids (Figures 2 and 8) comprising end bars 216, positioned transversely of the web path and suitably secured to the side members 200 of the second feed roll stand, and a plurality of spaced guide wires 218 extending between the end bars parallel to the path of the web. The feed rolls 94 of the second feed roll stand 52 are provided with a plurality of annular grooves 220 (Figure 2) to accommodate the guide wires 218. Hence, upon the severing of a bag length from the web 38, the outer end of the remaining integral web is prevented, by means of the guide grids, from wrapping around the feed rolls 94 of the strand 52.

Additionally, in order to facilitate handling and stacking of the finished bags as they are ejected from the machine, after being severed from the web, and fall onto the collecting chute 56, a static bar, indicated generally at 222, is positioned transversely above the path of travel of the web immediately beyond the cutter mechanism. This static bar 222, which serves to disrupt or neutralize the static charges on the stock 38, is a conventional element and will not be further described.

As previously indicated, the periodic advance of the web corresponds in extent to the desired bag length, and since the stock is tubular, each heat seal effected by the heat sealer 50 is intended to serve as the bottom closure for an individual bag. The web length between the heat sealer 50 and the cutter 54 is so adjusted that the stock is severed immediately adjacent the points of heat seal, so that the action of the cutter is to separate the closed bottom end of one bag from the open top end of the next. It is obvious, therefore, that proper registration of the cutter and the heat sealer relative to the web must be maintained. The web length between the heat sealer 50 and the cutter 54 must at all times be substantially equal to a whole number of bag lengths, and this extended length is necessarily variable to adapt the machine for fabricating bags of different lengths. To effect this adjustability and maintain registration, a roll spacer set (Figure 8), indicated generally at 224, is provided in the path of travel of the web between the heat sealer and the second feed roll pair, closely adjacent the latter.

The roll spacer set 224 comprises vertical guideways 226 extending upwardly from the machine frame 20 on opposite sides thereof and joined at their upper ends by a transverse member 228. A pair of horizontal longitudinally-spaced transverse rolls 230 are suitably journalled in bearings 232 which are slidably guided for vertical movement by the guideways 226. The bearing members 232 are simultaneously vertically adjustable by adjusting screws 234 threaded therethrough and extending the vertical height of each pair of the guideways 226. These adjusting screws 234 are rotatably mounted on the guideways 226 and are simultaneously adjustable to raise or lower the bearing members 232 by means of a transverse shaft 236 suitably journalled on the machine frame 20 and having spaced bevel gears 238 thereon engaging corresponding bevel gears 240 on the lower ends of the adjusting screws 234. Preferably, a bevel gear (not shown) on the end of the transverse shaft 236 engages a corresponding bevel gear (not shown) on the end of a control shaft 242 which extends toward the discharge end of the machine and has a suitable crank handle 244 thereon for adjustment of the roll spacer set 224 by the machine operator. On either side of the vertical guideways 226 and rotatably supported thereon by means of journal brackets 246 is a stationary roller 248. The web is arranged to pass under the first fixed roller 248, upwardly and over both vertically adjustable rollers 230, and thence downwardly under the other fixed roller 248. Hence, by suitably adjusting the vertical position of the vertically movable rollers 230 relative to the fixed rollers 248, by means of the handle 244, the stock length between the heat sealer 50 and the cutter 54 may be varied as desired.

The operation of the machine thus far described is substantially similar to the operation of the machine disclosed in the aforementioned copending application, as well as the former machine having mechanical counterparts of the latter. Hence, no detailed description of the normal operation of the machine as thus far described is necessary. Difficulties exist, however, with the operation of the machine as thus far described in securing bags of uniform length for a particular length setting of the machine. This non-uniformity of bag lengths is due in part to the stretchable characteristics of the plastic web upon which the machine is intended to operate and in large part to the inertia of the intermittently operated web-advancing mechanisms of the machine. As respects this latter difficulty, the mass and inertia of both pairs of feed rolls 94, together with that of their associated drives, from one-way engaging clutch 92 onwardly, urges the feed rolls to coast, that is, to continue their web-advancing rotation for an appreciable period of time after reversal of the rack 80 at the end of its web-advancing stroke. This coasting effect varies from stroke to stroke of the rack and also varies with the physical characteristics of the web being operated upon, that is with the thickness and stretchability of such web.

Further, in numerous instances it is desirable to use stock having a repeat pattern, such as advertising material or the like, printed thereon, in order that bags may be fabricated by the machine having a separate pattern printed on each bag. It is obvious that pre-printing of the rolls of stock prior to fabrication into individual bags by the machine will effect a substantial saving in printing cost, as contrasted to the separate printing of a design or pattern on each completed bag. Due to the stretchability of the stock used for the fabrication of bags by the machine, however, it has been found that when running a roll of stock through a conventional printing machine for printing a repeat pattern thereon, the spacing between each separate pattern varies progressively from one end of the roll to the other. Hence, in running such pre-printed stock through the bag making machine, it is necessary to substantially continually adjust the throw of the web-advancing crank 78 and also the roll spacer set 224 in order to obtain proper registration of a single pattern on each bag made by the machine from the pre-printed stock. Obviously, the necessity for such continual adjustment of the bag making machine not only hampers and slows down the operation of the machine to thus decrease its potential productive capacity, but also increases labor cost to thereby increase manufacturing cost of each bag.

The improvements effected by this invention overcome all of the foregoing disadvantages and not only secure uniformity of bag lengths on unprinted stock, but also enable repeat pattern pre-printed stock to be run through the machine with proper registration of the pattern on each separate bag fabricated on the machine.

In order to achieve these results and as best shown in Figure 5, the roll drive shaft 86 is divided immediately beyond the one-way engaging clutch 92 and the adjacent shaft ends are selectively drivingly connectible by a conventional electromagnetic clutch C mounted on such shaft ends. The clutch C comprises a driven plate 250 fixed to one of the adjacent shaft ends and a driving plate fixed to the other adjacent shaft end. The driving plate 252 is in the form of an electromagnet which, upon energization, provides sufficient magnetic attraction between the plates to effect a drive therethrough. Since the driving electromagnetic clutch plate 252 rotates, conventional commutator rings 254 are provided thereon, for engagement by suitable brushes mounted in a brush housing 256. The housing 256 is fixedly secured to one of several vertical struts 258 in the under frame 66, in which struts the divided shaft 86 is journally supported. Essentially, this arrangement merely comprises a conventional electromagnetic clutch incorporated in the roll drive shaft. Beyond the electromagnetic clutch C a metallic brake disc 260 is fixed to the shaft 86 for braking engagement by an electromagnetic disc 262 rotatably mounted on the shaft and secured against rotation to a side member 88 of the under frame 66. The basic parts of the clutch C and brake B are identical save for the addition of commutator rings to the clutch.

By means of this arrangement, it will be seen that when the electromagnetic clutch C is energized, the machine will operate in the normal manner, but that when the electromagnetic clutch C is deenergized, the web-advancing drive of the rolls 94 is disconnected and will become inoperative, even before the end of the web-advancing stroke of the rack 80 should the clutch C be deenergized prior to the end of such stroke. It also will be seen that energization of the electromagnetic brake B will immediately retard and rapidly and uniformly halt the web-advancing movement of the driving rolls 94 upon either the reversal of the advancing-stroke of the rack 80 or disengagement of the clutch C. These two instrumentalities, the electromagnetic clutch C and the electromagnetic brake B, are so electrically controlled that at the option of the operator plain or unprinted stock may be run through the machine and bag length uniformity achieved, or stock printed with a repeat pattern may be run through the machine with accurate registry of a single pattern or design on each bag.

Pattern registration on the machine is achieved by means of a photoelectric cell unit 264 suitably mounted to scan the travelling web 38 at a point between the heat sealer 50 and the spacer roll set 224. This unit 264 comprises a photoelectric cell P (Figure 10) encased in a suitable housing 266 supported on the end of a transverse rod 268 (Figure 9) that is slidably mounted in a bracket 270 for adjustment transversely of the web 38. The bracket 270 is slidably mounted on a guide rail 272 having a supporting plate 274 that extends longitudinally along and is bolted to the top of an upper side member 24 of the machine frame 20. A light source L (Figure 10) for the photoelectric cell P is encased in an appropriate housing 276 that is provided with a suitable lens system (not shown) and mounted on the end of another transverse supporting rod 278 in vertically spaced relation to the photoelectric cell housing 266 for passage of the semi- or substantially-transparent web 38 therebetween. The light source supporting rod 278 also slidably extends through the bracket 270 and has its other end fixedly connected, by a bar 280, to the corresponding end of the photoelectric cell supporting rod 268. A wing set screw 282 of the bracket 270 engageable with the rod 268 serves to maintain the cell and light source unit 264 in any desired adjusted position transversely of the web 38. Adjustment of the unit 264 longitudinally of, or parallel to, the path of travel of the web 38 is effected by means of an adjusting screw 284 (Figures 1, 2, and 8) suitably journalled at its opposite ends in bearings mounted on the guide rail supporting plate 274 and in threaded engagement with a lug on the side of the bracket 270. One end of this screw 284 desirably has a hand wheel 286 thereon for convenient longitudinal adjustment of the cell and light source unit 264 by a machine operator.

In order to control the various electrical circuits of the machine, four rotating cams 288, 290, 292, 294 (Figures 4 and 10) are adjustably mounted on one end of the sealer and cutter drive shaft 132 in stacked relationship. Circumferentially spaced about these cams and mounted on a suitable supporting plate 296 secured to the side members of the machine frame are four normally-open cam-controlled switches, CCS, BCS, ICS, and OCS, one for each cam and each having a follower riding the periphery of its corresponding cam. Each cam has a raised peripheral portion, best shown in Figure 10, which, when engaged by the follower of its corresponding switch, closes the switch. Conveniently mounted on one side of the machine frame 20 is an electrical control panel 298 (Figure 1) having five double-pole, single-throw, manually-operable switches RS, AS, PS, CS, and BS mounted thereon. These switches enable an operator to selectively control the electrical control circuits of the machine.

Referring now to Figure 10 of the drawings, which shows a schematic wiring diagram of the electric controls of the machine, the manual control switches RS, AS, PS, CS, and BS are all shown as being open, but the remaining switches, relays, and the cams 288, 290, 292, and 294 are shown in the position which they assume when the rack 80 is in position to start its web-advancing stroke.

A conventional electronic photoelectric cell amplifier or control A is connected to an appropriate source of power by conductors 300, 302 having the manual switch AS connected in series therein. The photoelectric cell P is connected to the amplifier A by conductors 304, 306, while the light source L takes its power from the conductors 300, 302 by means of an appropriate step-down transformer T.

Controlled by and having its energizing coil connected to the amplifier A by conductors 308, 310 is a photoelectric relay PR having a normally open single-pole, single-throw switch and a single-pole, double-throw switch. The amplifier A is of the type that will energize the relay PR when the light beam from the light source L to the photoelectric cell P is interrupted. Included in the amplifier A is a circuit which, if completed when the relay PR is energized, maintains the relay PR so energized until such circuit is interrupted. This circuit, which may be called a lock-in circuit, includes the cam controlled switch ICS and the normally-open contacts of the single-pole, double-throw switch of the photoelectric relay PR, connected in series into the amplifier by conductors 312, 314, and 316. Because of the inclusion of these latter contacts, the lock-in circuit may be termed self-energizing. The amplifier A also includes a circuit which, when complete, prevents energization of the relay PR even though the light beam to the photoelectric cell P is interrupted. This circuit, which may be termed a lock-out circuit, includes the cam-controlled switch OCS and the normally closed contacts of the single-pole, double-throw switch of the photoelectric relay PR, connected in series into the amplifier A by conductors 318, 320, and 316.

Since the electromagnetic brake B and the electromagnetic clutch C preferably are of the direct current type, a rectifier R is used to convert the alternating current from the conventional power source to direct current for energizing the brake and the clutch. Power is supplied to the rectifier R by conductors 322, 324, and 326 having the manual switch RS connected in series therein. Connected in series across the output of the rectifier R, by conductors 328, 330, and 332, are the electromagnetic clutch C and the normally-closed contacts of a clutch-brake relay CR having a single-pole, double-throw switch. Also connected in series across the output of the rectifier R, by conductors 328, 334, 336, 338, and 332, are the electromagnetic brake B and the normally-open contacts of the single-pole, double-throw switch of the clutch-brake relay CR. Desirably, condensers 340 of suitable capacity are shunted across each pair of input conductors for the brake B and the clutch C, respectively. It will thus be seen that the relay CR controls the application of power either to the clutch C or to the brake B, i. e., when the relay CR is deenergized power is applied to the clutch only and when energized to the brake only.

Connected to shunt the normally-open contacts of the single-pole, double-throw switch of the clutch-brake relay CR, by conductors 342 and 338, are the normally open contacts of a pre-brake relay BR. Preferably, the conductor 342 has a variable resistance or rheostat RV interposed therein. The purpose of this relay BR and rheostat RV will be explained later.

Connected in series across the power source, by conductors 322, 344, 346, 348, 326, and 324, are the energizing coil of the clutch-brake relay CR, the normally-open contacts of the single-pole, single-throw switch of the photoelectric relay PR, and the manual switch PS. Connected in parallel with the single-pole, single-throw switch of the relay PR, by conductors 348, 346, 350, 352, 354, 356, and 326, is a series connection of the cam-controlled switch CCS and the manual switch CS. Connected in series with the power source by conductors 322, 358, 360, 362, 364, 326, and 324, are the energizing coil of the pre-brake relay BR, the cam-controlled switch BCS, and the manual switch BS.

Referring now to Figure 12, it will be seen that the manually controlled switches are placed in various positions, depending upon whether pre-printed repeat pattern stock or unprinted plain stock is to be run through the machine. In the event that repeat pattern stock is to be run through the machine, the manually controlled switches RS, AS, PS, and BS are closed, thus supplying power to the rectifier R and to the photoelectric cell amplifier A and also making operative the circuit which includes the single-pole, single-throw switch of the photoelectric relay PR and the circuit which includes the energizing coil of the pre-brake relay BR. With the machine at the beginning of the web-advancing stroke of the rack 80, the cams of the cam-controlled switches will be in the position shown in Figure 10 relative to their respective switch followers. In this position the cam-controlled switch ICS is open so that the photoelectric relay lock-in circuit is open. Hence, the photoelectric relay PR is deenergized so that the clutch-brake relay CR is also deenergized to thus maintain the clutch C energized (engaged) and the brake B deenergized (released). It also will be noted that the cam-controlled switch OCS is closed, thus completing the lock-out circuit to prevent energization of the photoelectric relay PR by interruption of the light beam to the photoelectric cell P. Thereupon the rack may operate to advance the web one step in the normal manner.

After the rack-driving crank 78 has turned through an arc of 134°, with the cam 292 for the switch ICS turning through a corresponding arc, the elevated surface of the cam 292 closes the switch ICS in order to set up the lock-in circuit so that subsequent energization of the photoelectric relay PR by interruption of the light beam will maintain the relay PR in its thus energized condition. Upon one more degree rotation of the rack-driving crank 78, the cam 294 opens the cam-controlled switch OCS, thus rendering the lock-out circuit ineffective so that any subsequent interruption of the light beam will energize the photoelectric relay PR.

The necessity for the cam-controlled switch OCS and the thus controlled lock-out circuit for the photo-electric relay PR will be better understood by reference to Figure 11, wherein an advancing web 38 having a repeat pattern printed thereon is shown in operative relation with the photoelectric cell unit 264. By way of example there is shown a spaced pattern 366 on the web comprising a rectangular outline or border 368 having any desirable type of advertising material or a design enclosed therein. The forward line 370 of the rectangular border 368 may be used for interrupting the photoelectric cell actuating light beam. It will be seen that when this line 370 of the border 368 interrupts the light beam the lock-in circuit of the amplifier A maintains the photoelectric relay PR in energized condition, thus disengaging the clutch C and applying the brake B to quickly and uniformly arrest the forward travel of the web.

The photoelectric cell unit 264 is adjusted along its guide rail 272 in such longitudinal relation to the intermittently advancing web 38 that the line 370 interrupts the light beam shortly before the end of the web-advancing stroke of the rack 80, that is, somewhere along the 45° rotation of the rack-driving crank 78 after the lock-out circuit has been interrupted by the cam-controlled switch OCS. It will be seen that the lock-out circuit should not be interrupted by the cam-controlled switch OCS until the border line 370 is closely adjacent the photoelectric cell unit 264, or otherwise that portion of the preceding pattern 366 following the latter's border line 370 might interrupt the light beam and energize the photoelectric relay BR prematurely. In actual practice, the cam 294 of the cam-controlled switch OCS is shaped to interrupt the lock-out circuit at about the line of heat sealing 372 intermediate adjacent patterns 366 on the web, thus precluding premature energization of the photoelectric relay PR. It will be realized that the example given is only illustrative and that any line or even a dot printed as a repeat pattern on each bag section of the web may serve as a reference for actuation of the photoelectric cell unit 264.

After the web has been thus braked to a halt in an extremely short period of time, the rack-driving crank 78 continues the remaining rotation necessary to complete the pulling stroke of the rack 80, and then begins the 180° rotation thereof for the return stroke of the rack during which interval the web is at rest, and maintained at rest by the energization of the brake B, and heat sealing and severing operations are accomplished by the sealer and the cutter mechanisms. At approximately 43° before the end of this 180° non-web-advancing rotation of the crank 78, the cam 292 of the cam-controlled switch ICS opens the latter and so interrupts the lock-in circuit to thus deenergize the photoelectric relay PR, which deenergization also serves to deenergize the clutch-brake relay CR thereby releasing the brake B and reengaging the clutch C. Therefore the rack 80 can move the rolls 94 on the web-advancing stroke thereof. Shortly before or approximately 35° before the crank 78 begins to effect a web-advancing stroke of the rack 80, the cam 294 of the cam-controlled switch OCS closes the lock-out circuit, so that interruption of the light beam by that portion of the printed pattern or design following the border line 370 will not energize the photoelectric relay PR before the border line of the following pattern 366 advances into the light beam.

The above cycle of operation, that is, interruption of the light beam by the reference line on each pattern on the web with a consequent disengagement of the clutch C and application of the brake B to rapidly halt the advance of the web uniformly at each cycle of operation of the machine will continue indefinitely. It will be observed that variations in spacing between the separate patterns on the web are compensated for by the action of the photoelectric cell so that each pattern is properly registered on its corresponding bag.

In addition to the above described operations of clutch release and brake application, because it takes about one-tenth of a second to build up the magnetic field of the electromagnetic brake, B it has been found desirable to energize the brake somewhat in advance of the deenergization of the clutch. This advance brake energization may be termed pre-braking. The time period necessary for dissipation of an electromagnetic field is substantially nil, however, so that no consideration need be given to the period of time necessary for the clutch C to become deenergized after interruption of its energizing circuit. In order to energize the electromagnetic brake B to thus permit a build-up of its magnetic field sufficiently in advance of interruption of the light beam in order to obtain immediate and positive braking action upon interruption of the light beam, the cam-controlled switch BCS closes the energizing circuit of the pre-brake relay BR after the rack-driving crank 78 has advanced through about 118° of its total roll-advancing rotary movement of 180°. Energization of the pre-brake relay BR energizes the brake B.

The rheostat RV serves to vary the amount of current delivered to the brake B through the pre-brake relay BR and hence varies the braking effectiveness of the brake B when so energized. The rheostat RV is adjusted so that the amount of pre-braking torque of the brake B is insufficient to place an undue strain upon the driving motor 58 and the drive therefrom to the rolls 94. It will be noted that the pre-braking function of the cam-controlled switch BCS becomes inoperative at about 32° in advance of the beginning of the roll-advancing rotation of the crank 78. Of course, the stroke of the rack 80 between the application of the pre-braking force and the disengagement of the clutch C, by interruption of the light beam by the reference line on the repeat pattern on the web, is relatively short, so that the driving motor 58 works against the pre-braking load for only a relatively short interval of time during each cycle of operation of the machine. When the light beam is interrupted, full current is applied to the brake B and because of the already-existing electromagnetic field (because of pre-braking) the response of the brake is substantially instantaneous.

In the event that unprinted bags are to be made on the machine and non-pre-printed stock is therefore run therethrough, the manually controlled switches will be in the position shown in Figure 12 for plain bag operation. In this position of the control switches, the cam-controlled switch CCS essentially takes the place of the functions of the photoelectric cell P and the relay PR, that is, the contacts of this switch CCS are substituted for those of the single-pole, single-throw switch of the photoelectric relay PR. In this operation it will be seen that the rack-driving crank 78 advances through approximately 157° before the cam 288 closes the contacts of the cam-controlled switch CCS. When this switch CCS is so closed, the clutch-brake relay CR is energized to deenergize the clutch C and energize the brake B to rapidly halt the advance of the web. Therefore, because of the operation of the cam-controlled switch CCS, the web advances a uniform distance at each revolution of the crank 78. It also will be noted that for plain bag operation the manual switch BS is also closed to incorporate the pre-braking function of the relay BR as operated by the cam-controlled switch BCS.

In some instances of plain bag operation, depending to some extent on the physical characteristics of the stock, it is possible to dispense with the functions of the cam-controlled switch CCS and rely entirely on the pre-braking effect to halt the advance of the web immediately upon reversal of the web-advancing stroke of the rack 80. To this end the manual switch CS is opened and the rheostat RV adjusted to provide the minimum pre-braking torque which will achieve uniformity of bag lengths. In this connection, it is pointed out that the minimum pre-braking torque consistent with bag length uniformity is desirable at all times, even when operating with photoelectric control, in order to minimize brake drag on the driving motor 58.

It will thus be seen that the machine may be operated on either plain or printed stock without any overrun or "coasting" of the feed rolls so that bag length uniformity may be achieved in the former case and proper pattern registry achieved in the latter case. Thus, the objects of the invention have been fully and effectively accomplished. It will be realized, however, that various changes may be made in the specific embodiment disclosed to illustrate the principles of this invention without departing from such principles. Therefore, this invention includes all modifications which are encompassed by the spirit and scope of the following claims.

We claim:

1. Apparatus for intermittently advancing a web uniform distances, comprising: a pair of feed rolls; a reciprocating rack; a rack gear driven thereby; a drive from said gear to said rolls; a one-way engaging clutch in said drive; a controllable clutch in said drive on the driven side of said one-way engaging clutch; a normally inoperative brake for said drive on the driven side of said controllable clutch; means coordinated with the movement of said rack for simultaneously disengaging said controllable clutch and applying said brake; and additional means co-ordinated with the movement of said rack for applying said brake with reduced braking force in advance of the application thereof by said first mentioned coordinated means.

2. The structure defined in claim 1 in which the brake is electromagnetic and the additional means coordinated with the movement of the rack supplies reduced electric power to said brake to apply the latter with reduced force in advance of the application thereof by the first-mentioned coordinated means.

3. In the method of feeding a web in step-by-step fashion by web-advancing means having an intermittent drive, the steps of disconnecting the drive at a predetermined point in each web-advancing movement thereof, applying a braking force to the web-advancing means prior to the drive disconnection, increasing the braking force at the instant of drive disconnection, and maintaining the increased braking force for at least an appreciable time in order to secure uniformity of step movements of the web.

4. In the method of feeding a web having a repeat pattern thereon in step-by-step fashion past a station at which an operation is performed on the web, the feed of the web being effected by web-advancing means having an intermittent drive, the steps comprising: disconnecting the drive at a predetermined point in each web-advancing movement thereof; applying a braking force to the web-advancing means prior to the drive disconnection; increasing the braking force at the instant of drive disconnection; maintaining the increased braking force for at least an appreciable time; and controlling the drive disconnection by the position of each successive pattern on the web relative to the station in order to secure proper registry of each pattern at the station.

5. Apparatus for intermittently advancing a web uniform distances, comprising: a pair of feed rolls; an intermittent drive for said rolls; a clutch in said drive; a normally-inoperative brake for said rolls; means coordinated with said drive for disengaging said clutch and applying said brake at a predetermined point in the web-advancing movement of said drive; and additional means coordinated with said drive for applying said brake with reduced and adjustable braking force in advance of the application thereof by said first-mentioned coordinated means.

6. The structure defined in claim 5 in which the additional coordinated means includes a rotating cam.

7. The structure defined in claim 6 in which the brake is electromagnetic.

8. Registering feed apparatus for a repeat pattern web, comprising: a pair of feed rolls; an intermittent drive for said rolls; a clutch in said drive; a brake for said rolls independent of said clutch; means responsive to the pattern on the web for disengaging said clutch and applying said brake, and means coordinated with said drive for applying said brake with reduced and adjustable braking force in advance of the application thereof by said pattern-responsive means.

9. Apparatus for feeding a web comprising: a pair of feed rolls; an intermittent drive for said rolls; a clutch in said drive; a brake for said rolls; means responsive to a repeat pattern on the web for disengaging said clutch and applying said brake; means coordinated with said drive for disengaging said clutch and applying said brake; and means for selectively rendering said pattern responsive means and said drive coordinated means operative.

10. The structure defined in claim 9 including additional means coordinated with said drive for applying said brake with reduced adjustable force in advance of the application thereof by the pattern-responsive means or the first-mentioned coordinated means.

11. In apparatus for performing a repeat operation on a stretchable web, when at rest, in registry with a repeat pattern printed on the web and in which the web is advanced step-by-step by a pair of feed rolls having an intermittent drive, the combination of a normally-inoperative brake for the rolls, a clutch in the roll drive, light-sensitive means responsive to the pattern on the web for simultaneously applying said brake and disengaging said clutch, and means coordinated with the drive for applying said brake with reduced braking force prior to the application thereof by said light-sensitive means.

12. The structure defined in claim 11 in which the brake is electromagnetic and the coordinated means includes means supplying reduced electric power to said brake to apply the latter with reduced braking force in advance of the application thereof by the light-sensitive means.

13. The structure defined in claim 11 in which the coordinated means includes adjustable means for varying the force of brake application by said coordinated means.

(References on following page)

References Cited in the file of this patent

UNITED STATES PATENTS

| | | |
|---|---|---|
| 736,783 | Robinson | Aug. 18, 1903 |
| 1,030,183 | Inman | June 18, 1912 |
| 1,740,844 | Strout | Dec. 24, 1929 |
| 1,782,362 | McArthur | Nov. 18, 1930 |
| 1,796,073 | Beutel | Mar. 10, 1931 |
| 1,860,691 | Richard | May 31, 1932 |
| 1,871,272 | Jongedyk | Aug. 9, 1932 |
| 1,873,057 | Smith | Aug. 23, 1932 |
| 1,972,075 | Clark | Sept. 4, 1934 |
| 1,998,069 | Beutel | Apr. 16, 1935 |
| 2,006,040 | Crane | June 25, 1935 |
| 2,029,919 | Fuller | Feb. 4, 1936 |
| 2,077,439 | Schmitt | Apr. 20, 1937 |
| 2,080,292 | Webber | May 11, 1937 |
| 2,127,028 | Hayssen | Aug. 16, 1938 |
| 2,154,474 | Scott | Apr. 18, 1939 |
| 2,284,724 | Church | June 2, 1942 |
| 2,299,984 | Horwitz | Oct. 27, 1942 |
| 2,315,446 | Miller et al. | Mar. 30, 1943 |
| 2,326,931 | Dalton et al. | Aug. 17, 1943 |
| 2,389,929 | Paulsen | Nov. 27, 1945 |
| 2,490,416 | Collins | Dec. 6, 1949 |
| 2,544,241 | Sternad et al. | Mar. 6, 1951 |
| 2,560,566 | Graves et al. | July 17, 1951 |
| 2,636,732 | Howard | Apr. 28, 1953 |
| 2,648,183 | Dalton | Aug. 11, 1953 |